(12) United States Patent
Fisher et al.

(10) Patent No.: US 8,219,468 B2
(45) Date of Patent: Jul. 10, 2012

(54) DEVICE, SYSTEM, AND METHOD OF PROJECT PLANNING AND MANAGEMENT

(75) Inventors: Amit Fisher, Nofit (IL); Sima Nadler, Kochav Yair (IL); Aya Soffer, Haifa (IL); Gabi Zodik, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 12/038,824

(22) Filed: Feb. 28, 2008

(65) Prior Publication Data
US 2009/0222481 A1 Sep. 3, 2009

(51) Int. Cl.
*A01K 5/02* (2006.01)

(52) U.S. Cl. ............... 705/29; 705/1; 705/7; 705/37; 705/321; 705/53; 705/80; 705/35; 705/38; 707/705; 707/758; 707/804; 707/792; 707/802; 707/722; 707/999; 707/812; 709/205; 709/223; 709/217; 709/203

(58) Field of Classification Search .............. 705/29
See application file for complete search history.

(56) References Cited

U.S. PATENT DOCUMENTS

| | | | |
|---|---|---|---|
| 5,948,040 A | 9/1999 | DeLorme et al. | |
| 7,269,568 B2 | 9/2007 | Stiles et al. | |
| 2001/0047276 A1* | 11/2001 | Eisenhart | 705/1 |
| 2004/0133437 A1* | 7/2004 | Draper et al. | 705/1 |
| 2005/0216429 A1* | 9/2005 | Hertz et al. | 707/1 |
| 2006/0190391 A1* | 8/2006 | Cullen et al. | 705/37 |
| 2007/0073562 A1 | 3/2007 | Brice et al. | |
| 2007/0078729 A1 | 4/2007 | Brown | |
| 2007/0156480 A1* | 7/2007 | Jain et al. | 705/8 |
| 2007/0185744 A1 | 8/2007 | Robertson | |
| 2007/0288107 A1* | 12/2007 | Fernandez-Ivern et al. | 700/91 |
| 2008/0015880 A1* | 1/2008 | Freedenberg et al. | 705/1 |

OTHER PUBLICATIONS

Vanasco, Rocco R. Fraud auditing, 1998, Managerial Auditing Journal, v13n1, p. 4-71.*

* cited by examiner

*Primary Examiner* — F. Zeender
*Assistant Examiner* — Fawaad Haider

(57) ABSTRACT

Device, system, and method of project planning and management. For example, a method of project planning and management includes: publishing a representation of a project specification comprising one or more discrete objects; publishing a collaborative comment to one or more of the discrete objects; and receiving a supplier proposal to fulfill one or more of the discrete objects.

19 Claims, 3 Drawing Sheets

DEVICE, SYSTEM, AND METHOD OF PROJECT PLANNING AND MANAGEMENT

FIELD

Some embodiments of the invention are related to the field of project management systems.

BACKGROUND

A computing system may be used to facilitate project planning and management, for example, using a software application, e.g., Microsoft(®) Project. For example, some software applications allow a user to plan and/or manage a project by creating a Project Evaluation and Review Technique (PERT) chart, a Gantt chart, event chain diagrams, or the like.

Unfortunately, some project management software applications rely exclusively on insights and inputs provided by a single user, namely, the project manager. Furthermore, some project management software applications are relatively complex to operate and are not user-friendly.

SUMMARY

Some embodiments include, for example, devices, systems, and methods of project planning and management.

In some embodiments, for example, a method of project planning and management includes: publishing a representation of a project specification including one or more discrete objects; publishing a collaborative comment to one or more of the discrete objects; and receiving a supplier proposal to fulfill one or more of the discrete objects.

In some embodiments, the method includes: presenting the supplier proposal to at least a project initiator of the project specification; and receiving an indication of acceptance or rejection of the supplier proposal by the project initiator.

In some embodiments, the method includes: if the indication includes an indication of acceptance of the supplier proposal, closing the one or more discrete objects which the supplier proposal fulfills.

In some embodiments, the method includes: if the indication includes an indication of acceptance of the supplier proposal, generating a binding contract between the project initiator and the supplier based on content of the supplier proposal.

In some embodiments, the method includes: if the indication includes an indication of acceptance of the supplier proposal, updating a project itinerary to reflect content of the supplier proposal.

In some embodiments, the method includes: receiving an indication of acceptance of the collaborative comment by the project initiator; and automatically modifying the project specification based on the collaborative comment.

In some embodiments, the modifying is selected from the group consisting of: automatically adding an object to the project specification; automatically removing an object from the project specification; and automatically modifying an object of the project specification.

In some embodiments, the method includes: receiving a command to link between two or more of the discrete objects; linking between the two or more discrete objects; and publishing a linkage between the two or more discrete objects.

In some embodiments, the linking includes: creating a dependency between the two or more discrete objects, wherein the dependency is selected from the group consisting of: mandatory one-way dependency; mandatory two-way dependency; and non-mandatory dependency.

In some embodiments, at least one discrete object is associated with one or more object attributes representing one or more characteristics of the discrete object set by a project initiator of the project specification.

In some embodiments, the one or more object attributes are selected from the group consisting of: location for object fulfillment, date for object fulfillment, time for object fulfillment, and price limit for object fulfillment.

In some embodiments, the method includes: reusing one or more of the published discrete objects in for creation of another project specification.

In some embodiments, the method includes: receiving from a project initiator input indicating a topic associated with the project specification; and presenting to the project initiator a list of user-selectable previously-created discrete objects related to the topic.

In some embodiments, an apparatus for project planning and management includes: a server to publish a representation of a project specification including one or more discrete objects, to publish a collaborative comment to one or more of the discrete objects, and to receive a supplier proposal to fulfill one or more of the discrete objects.

In some embodiments, a system for project planning and management includes: a server to receive and publish a representation of a project specification including one or more discrete objects; to receive and publish a collaborative comment to one or more of the discrete objects; and to receive a supplier proposal to fulfill one or more of the discrete objects; wherein the server is to receive a command to link between two or more of the discrete objects; to link between the two or more discrete objects; and to publish a linkage between the two or more discrete objects; and wherein the server includes: an acceptance/rejection interface to present the supplier proposal to at least a project initiator of the project specification, and to receive an indication of acceptance or rejection of the supplier proposal by the project initiator.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
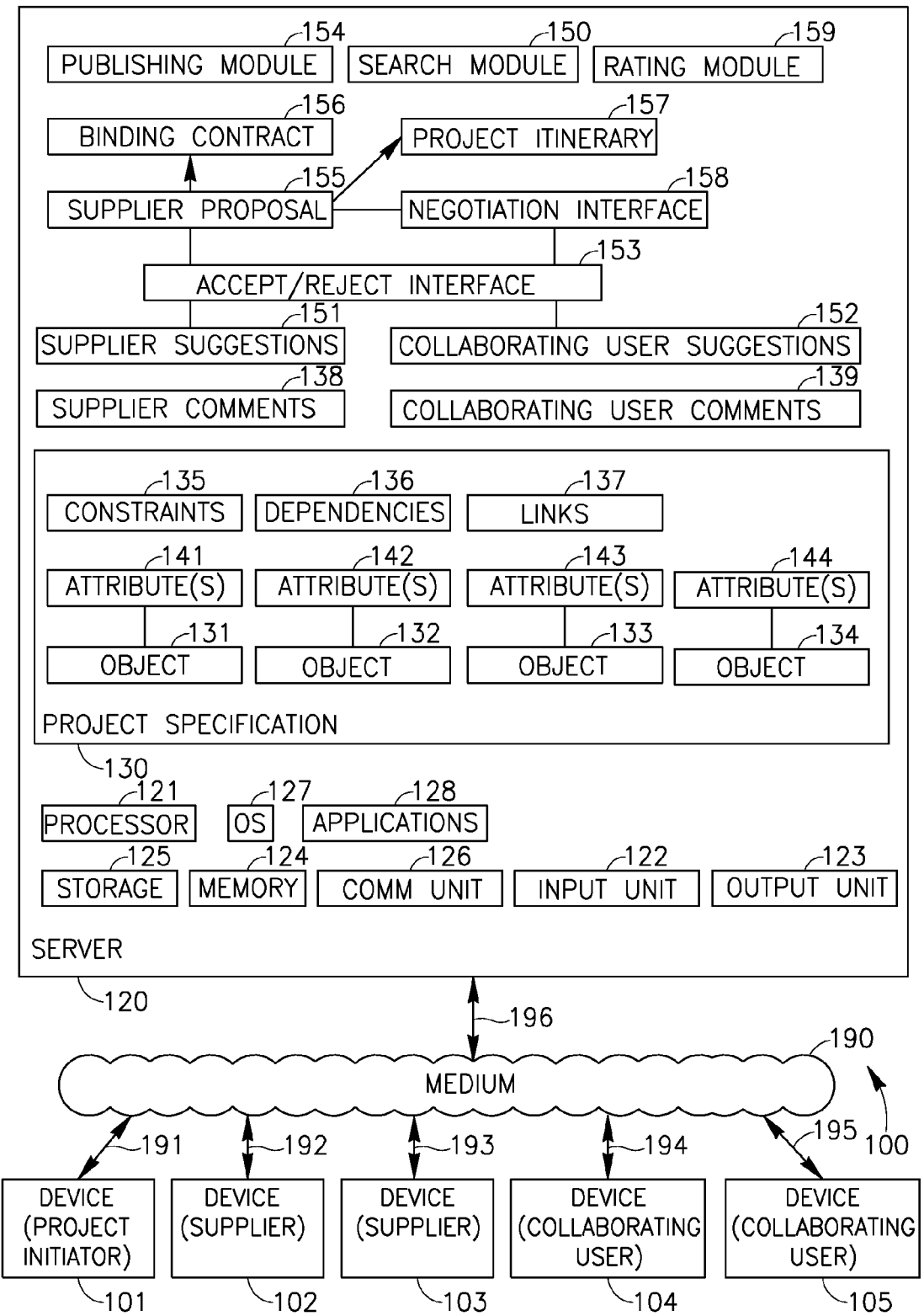
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm® Treo(™)), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee(™), Ultra-Wideband (UWB), Global System for Mobile communication (GSM), 2G, 2.5G, 3G, Third Generation Partnership Project (3GPP), 3.5G, or the like. Some embodiments may be used in conjunction with various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

The terms "social network" or "virtual social network" or "VSN" as used herein include, for example, a virtual community, an online community, a community or assembly of online representations corresponding to users of computing devices, a community or assembly of virtual representations corresponding to users of computing devices, a community or assembly of virtual entities (e.g., avatars, usernames, nicknames, or the like) corresponding to users of computing devices, or the like.

In some embodiments, a virtual social network includes at least two users; in other embodiments, a virtual social network includes at least three users. In some embodiments, a virtual social network includes at least one "one-to-many" communication channels or links. In some embodiments, a virtual social network includes at least one communication channel or link that is not a point-to-point communication channel or link. In some embodiments, a virtual social network includes at least one communication channel or link that is not a "one-to-one" communication channel or link.

The terms "social network services" or "virtual social network services" as used herein include, for example, one or more services which may be provided to members or users of a social network, e.g., through the Internet, through wired or wireless communication, through electronic devices, through wireless devices, through a web-site, through a stand-alone application, through a web browser application, or the like. In some embodiments, social network services may include, for example, online chat activities; textual chat; voice chat; video chat; Instant Messaging (IM); non-instant messaging (e.g., in which messages are accumulated into an "inbox" of a recipient user); sharing of photographs and videos; file sharing; writing into a "blog" or forum system; reading from a "blog" or forum system; discussion groups; electronic mail (email);

folksonomy activities (e.g., tagging, collaborative tagging, social classification, social tagging, social indexing); forums; message boards; or the like.

The terms "web" or "Web" as used herein includes, for example, the World Wide Web; a global communication system of interlinked and/or hypertext documents, files, websites and/or web-pages accessible through the Internet or through a global communication network; including text, images, videos, multimedia components, hyperlinks, or other content.

The term "project" as used herein includes, for example, a venture or endeavor undertaken in order to create a product or a service; a production; a task; a set of tasks; a series of tasks; a business or professional project; a personal or home-related project; a task that requires or involves planning ahead; a task that has a start date and/or an end-date, and optionally one or more milestones; a task intended to produce one or more deliverables; a task that requires organization, management and/or resource allocation to achieve one or more goals (e.g., time constraints, cost constraints, quality requirements); a process; an ongoing process or a recurring task; or the like.

Although portions of the discussion herein relate, for demonstrative purposes, to a wedding production project, other types of projects may be planned and managed using some embodiments of the invention, for example, renovation of a house, establishment of a business, geographical trip having one or more legs, production of a conference event, or the like.

The terms "project owner" or "project initiator" as used herein includes, for example, a person or entity that initiates a project; a person or entity that defines a project; a person or entity that plans a project; a person or entity that manages a project; a person or entity capable of setting project parameters and/or modifying project parameters; or the like.

The term "supplier" as used herein includes, for example, a person or entity capable of or interested in supplying goods and/or services; a provider; a merchant; a vendor; a seller; a retailer; a wholesaler; a purveyor; a contractor; a freelancer; an outsourced contractor; or the like.

The term "user" as used herein includes, for example, a person or entity that owns a computing device or a wireless device; a person or entity that operates or utilizes a computing device or a wireless device; or a person or entity that is otherwise associated with a computing device or a wireless device.

The term "friend" as used herein includes, for example, another user; a family member; a relative; an acquaintance; a colleague; a co-worker; a person that the user knows from personal, professional or other backgrounds; a person that the user knows from real-world interaction or meeting; and/or a person that the user knows from virtual interaction and/or virtual meeting (e.g., email exchange, instant messaging, online chat, or the like).

At an overview, some embodiments include devices, systems, and methods of project planning and management. Some embodiments allow to automate the process of planning, management and/or execution of a project by creating a social network of interested parties who contribute inputs or otherwise collaborate (e.g., "many-to-many") with regard to the project.

For example, a project initiator defines a project specification using (or re-using) composable objects. One or more suppliers may provide proposals regarding one or more objects or regarding the entire project; may provide comments to the project specification; or may provide suggestions for modification of objects or for addition of new objects. Similarly, one or more other users (e.g., friends of the project initiator, and/or users that have experience with similar projects or special knowledge about such projects) may provide comments to the project specification; or may provide suggestions for modification of objects or for addition of new objects.

The project includes a set of composed of composable objects or elements, optionally associated with dependencies, constraints, priorities, or other attributes. The composable structure of the project allows suppliers and other users to selectively interact with regard to well-defined parts of the project.

Once the project initiator is satisfied with inputs received from suppliers and/or other users, the project initiator may terminate ("close") the project planning. The system may automatically produce one or more deliverables, for example, an itinerary or chart describing the planned project; as well as one or more binding contracts between the project initiator and one or more suppliers.

FIG. 1 schematically illustrates a block diagram of a system 100 in accordance with some demonstrative embodiments of the invention. System 100 includes multiple computing devices, for example, devices 101-105. Each one of devices 101-105 may include a wired computing devices or a wireless computing devices, for example, a desktop computer, a laptop computer, a PDA device, a cellular phone, or the like.

In some demonstrative embodiments, for example, device 101 is operated by a project initiator who initiates a project; devices 102-103 are operated by suppliers; and devices 104-105 are operated by collaborating users, e.g., to provide comments, suggestions, and other collaborative input regarding the project.

Each one of devices 101-105 is able to interact and/or communicate with a server 120 through one or more communication channels or mediums, for example, a shared access medium 190, e.g., utilizing communication links 191-196. The shared access medium 190 may be, for example, a global communication network, the Internet, the World Wide Web, a wired network, a wireless network, a combination of one or more wired networks and/or one or more wireless networks, or the like.

In some demonstrative embodiments, for example, system 100 may be utilized in order to plan a project of a wedding event. For example, the project initiator may utilize the device 101 in order to create a project specification 130 including one or more discrete elements or objects, for example, objects 131-134. Object 131 may represent "wedding location"; object 132 may represent "food catering"; object 133 may represent "photography"; and object 134 may represent "music". Other objects may be used, for example, representing a preferred date, a preferred time of day, an estimated number of guests, or the like. The division of the project specification 130 into objects may allow multiple users, including suppliers and collaborating users, to selectively submit comments or proposals directed to one or more objects or to a set of objects, and not necessarily to the entire project specification 130.

In some embodiments, the project initiator may create or define "from scratch" one or more of objects 131-134. In other embodiments, the project initiator may re-use and/or modify one or more objects previously created by himself and/or by other users of system 100 in previous projects. In still other embodiments, server 120 may include a repository of pre-defined objects from which the project initiator may select objects for utilization, insertion or modification. In some embodiments, optionally, the project initiator may select a type of project (e.g., production of an event, planning of a trip, renovation of a house), and server 120 may automatically suggest to the project initiator one or more objects (or a set of objects) that are related to the selected project type, e.g., from a repository of pre-defined objects and/or from previously-created objects. In some embodiments, other information retrieval techniques may be used to initially auto-populate the objects of the project specification 130.

In some embodiments, system 100 need not be limited by a fixed set of objects associated with a pre-defined set of attributes or function, but rather, may utilize a flexible or modular structure. In some embodiments, server 120 may present to the project initiator a set of reusable objects, optionally associated with a common set of attributes. Additionally, users may reuse previously-created objects, and may enhance, modify or fine-tune such objects to meet particular requirements of preferences.

Each one of objects 131-134 may be associated with one or more attributes, characteristics, constraints, requirements, or preferences, for example, represented using attributes 141-144, respectively. Attributes 141-144 may represent, for example, time-related requirements, location-related requirements, cost-related requirements, size-related requirements, or the like. Optionally, attributes 141-144 may represent dependencies among two or more objects 131-134. In some embodiments, each one of attributes 141-144 may represent a single value (e.g., a mandatory requirement); in other embodiments, each one of attributes 141-144 may represent multiple requirements, optionally associated with an order of preference or with other priority information.

For example, object 131 representing "wedding location" may be associated with attributes 141 indicating: a mandatory requirement that the wedding location accommodate at least 200 guests; a mandatory requirement that the wedding location be an indoor location; a preference that the wedding location be on a beach; a first priority preference that the wedding location be in Manhattan, and a second (e.g., lower) priority preference that the wedding location be in the greater New York City area; and a requirement of cost limit of 4,000 dollars. Similarly, object 132 representing "food catering" may be associated with attributes 142 indicating, for example: a mandatory requirement to have capacity to serve at least 250 guests; a preference to have an all-dairy menu; a cost limit of 63 dollars per guest; and a non-mandatory requirement to have capacity to serve at least three different types of pasta dishes. Object 133 representing "photography" may be associated with attributes 143 indicating, for example: a mandatory requirement for still photography; an optional requirement for video photography; a preference for photographers having at least five years of experience in wedding photography; and a cost limit of 3700 dollars. Object 134 representing "music" may be associated with attributes 144 indicating, for example: a mandatory requirement for a music band capable of playing country music; a preference for a music band that has a female lead singer; and a cost limit of 2750 dollars.

Optionally, two or more of the objects 141-144 may be associated with a common constraint 135 (or with a set of multiple common constraints). The common constraint 135 may be manually defined by the project initiator; or may be automatically determined by server 120 or automatically carried from a first object to a second object. For example, the project initiator may define that the wedding take place on May fifth; accordingly, server 120 may automatically add this data as a common time constraint 135 associated with all objects 141-144, or may add this data as an attribute (e.g., among other attributes 141-144) associated with multiple objects.

Optionally, one or more of the objects 131-134 may be associated with one or more dependencies 136, for example, between a first object and a second object, between an object and a set of objects, or between an object and external parameters. For example, dependencies 136 may indicate that the "music" object 134 of the type "music band" is dependent on having a "wedding location" object 131 that can accommodate a music band, or the like. Similarly, for example, the dependencies 136 may indicate that the project initiator is interested in "photography" only if the selected wedding location is in Manhattan. Other dependencies 136 may be used.

Optionally, two or more objects 141-144 may be inter-linked or otherwise related using relations or links 137. For example, the project initiator may define a link 137 to indicate his preference that the "wedding location" and the "food catering" be supplied by a single supplier, and not by two separate suppliers. Additionally, another link 137 may indicate that if a first object is provided, then a second particular object is required to be provided as well. Accordingly, links 137 may indicate that objects 141 and 142 are inter-linked. In some embodiments, link 137 between objects may utilize pre-defined semantics. For example, a "mandatory" link 137 indicates that objects are strongly linked, and selection of a first object 131 requires selection of a second object 132. In contrast, an "optional" or "non-mandatory" or "voluntary" link 137 may be informative only, e.g., reflecting a preference and not a strict requirements; for example, if the "wedding location" is in the North region of the state, then it is preferred (but not mandated) that the photographer will have a studio in the North region of the state.

In some embodiments, each attribute 141-144 may include, for example, a description, an ID, a type, or other parameters. System 100 may utilize a pre-defined type system including substantially all the common types required, as well as pre-defined semantics. In some embodiments, optionally, an attribute of an object may be of an "object" type, in order to allow system 100 to utilize sub-attributes or other class/sub-class hierarchy; for example, the "music" type may be associated with multiple attributes, e.g., "duration" and "style". In some embodiments, an administrator of server 120 or system 100 may ad new types, while preserving the semantic of existing projects.

Server 120 publishes the project specification 130, or otherwise makes it available to other users, for example, suppliers utilizing the devices 102-103 and collaborating users utilizing the devices 104-105. For example, server 120 may include a repository to store project specifications posted by multiple project initiators; and may include a search module 150 allowing users to search and retrieve selected project specifications. Suppliers and collaborating users may browse project specifications, or may search for project specification(s) by utilizing the search module 150 based on objects (e.g., "show all project specification that include a "photography" object"), keywords (e.g., "vegetarian"), topics (e.g., "wedding"), free-text search utilizing Boolean operators (e.g., "wedding AND Boston"), or using other filter-in or filter-out parameters to narrow or broaden the search results.

Suppliers may selectively post supplier comments 138 to one or more objects 131-134 of the project specification 130; and collaborating users may selectively post collaborating user comments 139 ("collaborative comments") to one or more objects 131-134 of the project specification 130. For example, a supplier may utilize the device 102 in order to post a comment to the "wedding location" object 131, commenting that since the project initiator is interested in having the wedding in the month of May, the project initiator may consider also outdoor wedding locations and not only indoor wedding locations. Similarly, for example, a collaborating user may utilize the device 104 in order to post a comment to the "photography" object 133, commenting that from her experience it is important that the photographer will be able to provide all the photographs using a digital medium and not only in printed format. Supplier comments 138 and collaborating user comments 139 may be published by server 120; may be viewed, for example, by the project initiator, by other suppliers, and by other collaborating users; and may be searched using the search module 150.

Similarly, suppliers may selectively submit supplier suggestions 151 to one or more objects 131-134 or to the project specification 130; and collaborating users may selectively submit collaborating user suggestions 152 ("collaborative suggestions") to one or more objects 131-134 or to the project specification 130. For example, suggestions 151 or 152 may include a suggestion to add an object to the project specification; a suggestion to remove an object from the project specification; a suggestion to modify an object (or an attribute thereof); a suggestion to add or remove or modify a dependency 136 or a link 137 among objects; or the like. Suggestions 151 and 152 may be published by server 120; may be viewed, for example, by the project initiator, by other suppliers, and by other collaborating users; and may be searched using the search module 150. Optionally, an accept/reject interface 153 or similar mechanism may be used by system 100 in order to allow the project initiator to rapidly accept a posted suggestion; upon such acceptance, server 120 may automatically add, remove or modify the relevant objects of the relevant project specification.

In some embodiments, server 120 may utilize a publishing module 154 to notify users (e.g., the project initiator, suppliers, and collaborating users) about updates to the project specification 130, about posted comments 138-139, about posted suggestions 151-152, about modifications made to the project specification 130, or the like. The publishing module 154 may utilize one or more communication channels, for example, in accordance with preferences of the relevant recipient, e.g., electronic mail, Instant Messaging (IM), SMS messages, or the like.

Suppliers may further utilize system 100 in order to selectively submit proposals 155 regarding one or more objects, or regarding the entire specification 130. For example, a photographer may submit a proposal 155 with regard to the "photography" object 133; whereas a wedding hall may submit another proposal with regard to the "wedding location" object 131 and the "food catering" object 132, combined. In some embodiments, proposals 155 may be published and may be seen by all users; in other embodiments, proposals 155 may be hidden from users other than the project initiator.

In some embodiments, a proposal 155 may include sufficient details, including price and other terms and conditions, to allow creation of a binding contract 156 if the project initiator selects to accept the proposal 155, e.g., using the accept/reject interface 153. In some embodiments, posting of a proposal 155 may be defined to reflect an intention of the supplier to be legally bound by a binding contract if the project initiator accepts the proposal 155. Similarly, the acceptance of the proposal 155 by the project initiator may be defined to reflect an intention of the project initiator to e bound by that contract.

Optionally, the project initiator may selectively accept a first proposal 155 regarding a first object 131, and may selectively reject a second proposal regarding a second object 131. In some embodiments, once a user accepts a supplier's proposal 155 regarding a particular object, this object may automatically become "close" and no further proposals may be submitted for this object. In some embodiments, once a user accepts a supplier's proposal 155 regarding one or more objects, the content of the proposal is added to a project itinerary 157, which may be constructed by server 120 by assembling all the accepted proposals.

In some embodiments, server 120 may optionally include a negotiation interface 158 (e.g., in addition to the accept/reject interface 153), allowing the project initiator to negotiate with a supplier that submitted a proposal 150, for example, by submitting a counter-offer or by requesting modification of one or more terms of the proposal 155. The supplier may then submit a new proposal 155, attempting to accommodate the requests or the project initiator.

In some embodiments, the project itinerary 157 may further reflect a timing scheme or other ordering scheme among objects 131-134. For example, the project initiator may indicate, upon creation of the project specification, that the "wedding" project commences with a first object (e.g., "music"), then continues to a second object (e.g., "food catering"), then continues to a third object, etc. This ordering may be reflected in the final project itinerary 157 generated by server 120.

In some embodiments, the project initiator may create or utilize objects for which proposals are not solicited. For example, the "wedding" project specification may include a "best-man speech" object; collaborating users may submit comments or suggestions to this object, but this object may be and may remain closed for supplier proposals; the object may still appear in the final project itinerary 157 generated by server 120. Similarly, the project initiator may determine, prior to submitting the project specification 130, that the "photography" object 133 will be closed for proposals, since he already hired a photographer. Furthermore, the project initiator may determine, after the initial submission of the project specification 130, to selectively close the "photograph" object 133 from receiving proposals, since the project initiator already hired a photographer externally to system 100. In some embodiments, the project initiator may selectively close one or more objects, and may optionally re-open an object (e.g., due to a cancellation by a supplier) prior to closure of the entire project specification 130. In some embodiments, once the project initiator closes the entire project specification 130, or closes all its objects 131-134, then no further supplier proposals 155 may be submitted; whereas objects 131-134 may be selectively re-used by other users, and the entire project specification 130 may be re-used by other users.

In some embodiments, system 100 may utilize a rating module 159 allowing users to rate, provide a score, provide positive feedback, or provide negative feedback to submitted information. For example, users may provide positive feedback or high rating score, indicating that a particular supplier comment 138 is very helpful; or users may provide negative feedback or low rating score, indicating that a particular collaborating user suggestion 152 is considered to be non-beneficial. Additionally, rating and scores may be used with regard to collaborating users or suppliers; for example, users may submit rating scores about a particular supplier based on their past experience with him; users may submit rating scores indicating that a particular collaborating user is highly-regarded in the collaborative community; or the like.

In some embodiments, project specification 130 may include discrete sub-projects, and system 100 may be used in order to plan and/or manage multiple sub-projects, for example, in parallel or in series. For example, a "wedding production" project may be divided into two sub-projects, namely, a first sub-project regarding "wedding ceremony"

(e.g., to take place in the morning, with a first set of objects), and a second sub-project regarding "wedding dinner" (e.g., to take place in the evening, with a second set of objects). Optionally, links 137 or dependencies 136 may be defined among objects of multiple sub-projects.

In some embodiments, optionally, system 100 may be associated with a virtual social network (e.g., "FaceBook" or "LinkedIn"), or may be implemented as an application of a virtual social network. For example, once the project initiator defines the project specification 130, users that are defined as "friends" of the project initiator in the virtual social network may be invited to review the project specification 130 and to comment on it based on their experience and insights.

In some embodiments, links 137 and/or dependencies 136 among two or more objects 131-134 may be defined by suppliers or may be suggested by suppliers (e.g., subject to approval of the project initiator). For example, within the "wedding" project, a supplier may submit a supplier proposal 155 indicating that the supplier is able to supply the "wedding food" object only if the same supplier also supplies the "wedding hall" object, or vice versa; or that a discounted price associated with the "food" object is conditioned upon hiring the same supplier for the "photography" object.

In some embodiments, system 100 may include version management or version control tools, to allow maintenance of multiple versions of a project being planned or managed. System 100 or server 120 may track, maintain and update a log of substantially all the operations performed by users, or may otherwise track the development and history of the project structure. In some embodiments, optionally, the project initiator may accept a supplier proposal 155, and may later "undo" his acceptance and revert to a previous option or a previous version of the project. In some embodiments, a supplier proposal 155 may be time-limited or time-restricted, and may not be available any more once the project initiator performs an "undo" operation; accordingly, the time-limited supplier proposal 155 may automatically expire, and the project initiator may be notified (e.g., using a pop-up window or message) that his "undo" operation cannot revive the already-expired time-limited supplier proposal 155. In some embodiments, the version management may allow the user to selectively "undo" or "redo" one or more operations or sets of operations, for example, acceptance or rejection of supplier proposals 155, acceptance or rejection of supplier suggestions 151 or collaborating user suggestions 152, or the like.

In some embodiments, server 120 may be implemented using suitable hardware components and/or software components, for example, a processor 121, an input unit 122, an output unit 123, a memory unit 124, a storage unit 125, and a communication unit 126. Similar components may be included in the client devices 101-104.

Processor 121 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 121 executes instructions, for example, of an Operating System (OS) 127 or of one or more applications 128.

Input unit 122 includes, for example, a keyboard, a keypad, a mouse, a touch-pad, a joystick, a track-ball, a stylus, a microphone, or other suitable pointing unit or input device. Output unit 123 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 124 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 125 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 124 and/or storage unit 125, for example, store data processed by server 120.

Communication unit 126 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, communication unit 126 includes, or is associated with, one or more antennas.

In some embodiments, some or all of the components of server 120 are enclosed in a common housing or packaging, and are interconnected or operably associated using one or more wired or wireless links. In other embodiments, components of server 120 are distributed among multiple or separate devices or locations.

Some embodiments may utilize client/server architecture, publisher/subscriber architecture, centralized architecture, scalable Peer-to-Peer (P2P) architecture, a fully distributed architecture, a semi-distributed or partially-distributed architecture, or other suitable architectures or combinations thereof.

Figure 2:
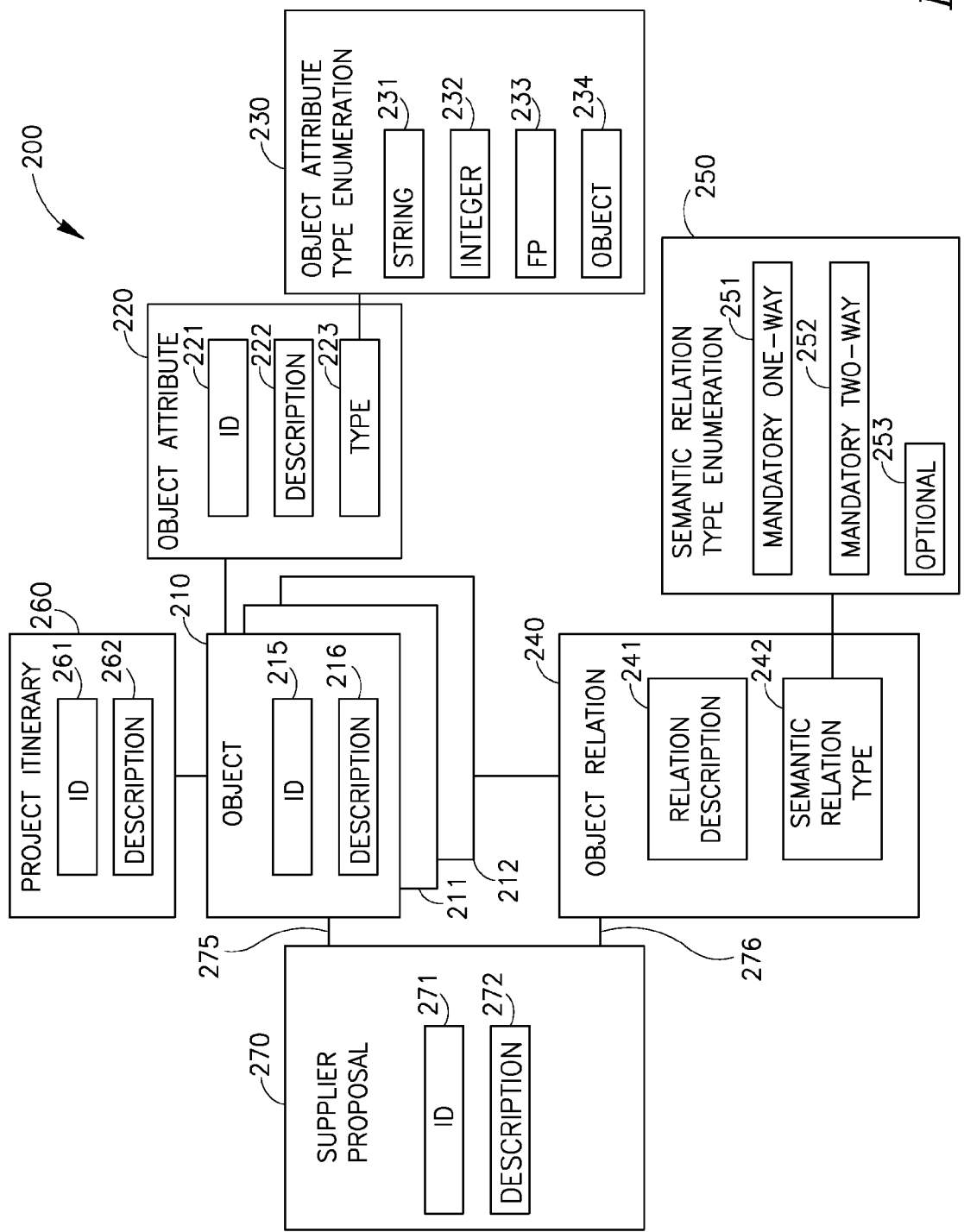
FIG. 2 is a schematic block diagram illustration of a structure of components used in project planning and management, in accordance with some demonstrative embodiments of the invention.

FIG. 2 schematically illustrates a block diagram of a structure 200 of components used in project planning and management, in accordance with some demonstrative embodiments of the invention. Structure 200 may be used, for example, by system 100 or server 120 of FIG. 1, or by other suitable units, devices and/or systems.

Structure 200 includes multiple objects 210-212 which represent discrete components of a project being planned or managed. For example, object 210 may have an ID 215 and a description 216. Object 210 may be associated with one or more object attributes 220. In some embodiments, an object attribute (e.g., "cost" or "location") may be associated with more than one of objects 210-212.

Object attribute 220 may have an ID 221, a description 222, and an object attribute type 223. As indicated by the object attribute type enumeration 230, the object attribute type 223 may be, for example, a string 231, an integer 232, a floating point number 233, an object 234, or the like.

Two or more of objects 210-212 may be associated with an object relation 240, for example, having a relation description 241 and a semantic relation type 242. As indicated by the semantic relation type enumeration 250, the semantic relation type may be, for example, a mandatory one-way relation 251, a mandatory two-way relation 252, an optional relation 253, or the like.

Structure 200 may include one or more objects or items representing supplier proposals, for example, a supplier proposal 270 created by a supplier, including an ID 271 and a description 272. As indicated by a link 275, the supplier proposal 270 is related or linked to, or associated with, one or more particular objects (e.g., object 210); for example, the object 210 may represent that "photography services are needed", and the related supplier proposal 270 may represent that "photography services will be provided by the supplier".

Optionally, as indicated by a link 276, the supplier proposal 270 may be associated with one or more object relations 240, to indicate that the supplier proposal 270 suggests or requires a link, a relation or a dependency with or among two or more objects 210-212. For example, object 210 may represent that "photography services are needed"; object 211 may represent that "music services are needed"; and the supplier proposal 270 may be associated with one or more object relations 240 to represent that "photography and music services will be provided together by the supplier". Other suitable relations, dependencies, or links may be used.

Structure 200 further includes a project itinerary 260, for example, as a deliverable produced by the project planning system, e.g., subsequent to acceptance of proposals from suppliers and/or "closure" of objects by the project initiator. The project itinerary 260 may have an ID 261 and a description 262.

Other suitable parameters and/or structures may be used.

Figure 3:
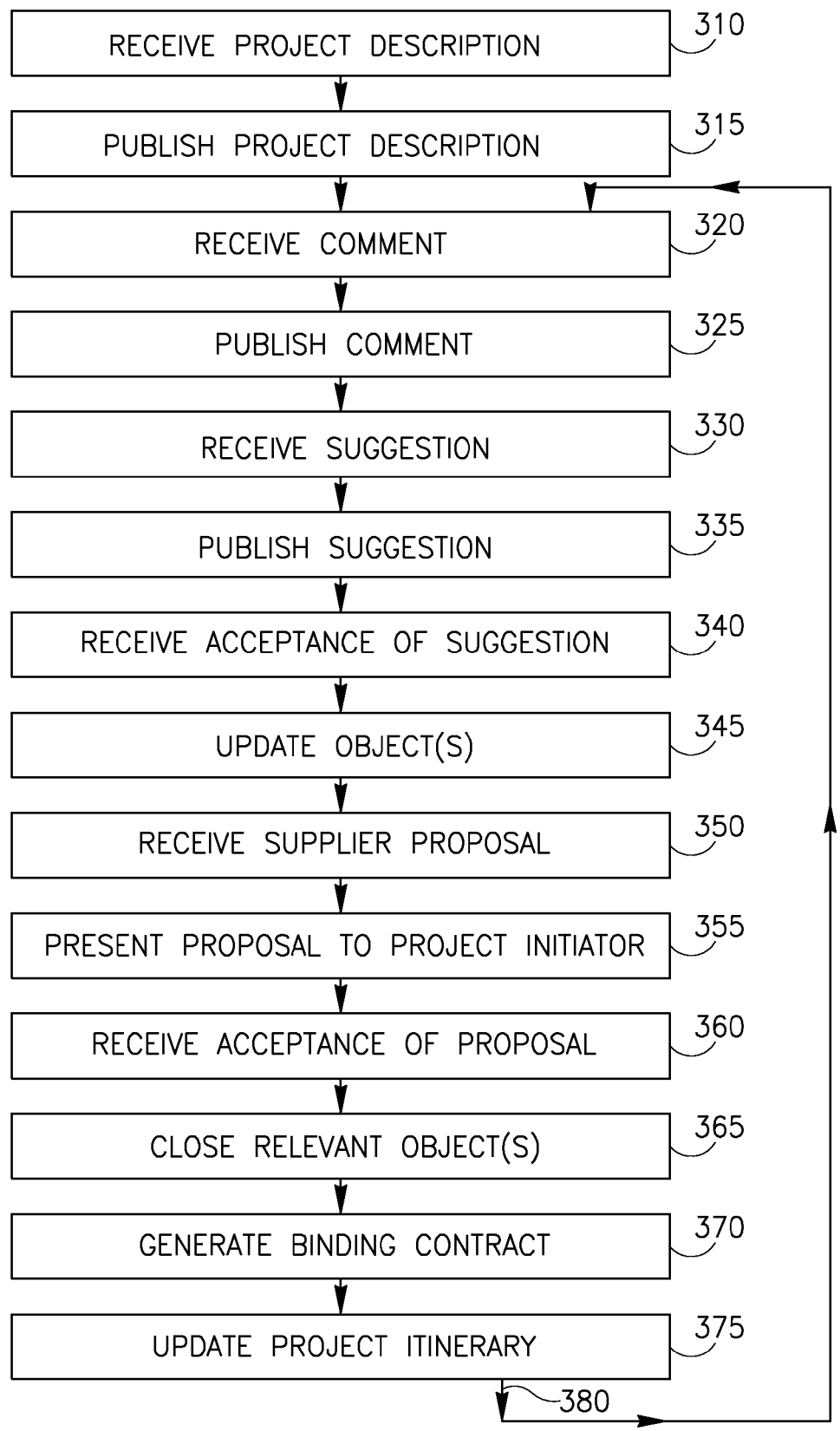
FIG. 3 is a schematic flow-chart of a method of project planning and management, in accordance with some demonstrative embodiments of the invention.

FIG. 3 is a schematic flow-chart of a method of project planning and management, in accordance with some demonstrative embodiments of the invention. Operations of the method may be used, for example, by system 100 of FIG. 1, and/or by other suitable units, devices and/or systems.

In some embodiments, the method may include, for example, receiving from a project initiator a project description divided into discrete objects (block 310), optionally having dependencies or other relation among objects.

In some embodiments, the method may include, for example, publishing the project description to suppliers and/or collaborating users (block 315).

In some embodiments, the method may include, for example, receiving comments from suppliers and/or collaborating users (block 320), and publishing the comments (block 325).

In some embodiments, the method may include, for example, receiving suggestions from suppliers and/or collaborating users (block 330), and publishing the suggestions (block 335).

In some embodiments, the method may optionally include, for example, receiving from the project initiator an acceptance of a suggestion (block 340), e.g., through an accept/reject interface; and automatically updating, modifying, adding or removing one or more objects based on the accepted suggestion (block 345).

In some embodiments, the method may include, for example, receiving from a supplier a proposal to fulfill one or more objects (block 350); and presenting the proposal to the project initiator (block 355), for example, through the accept/reject interface.

In some embodiments, the method may optionally include, for example, receiving from the project initiator an acceptance of a proposal (block 360), e.g., through an accept/reject interface.

If the project initiator accepted the proposal, then the method may include, for example, closing the relevant object(s) to further proposals (block 365), generating a binding contract between the supplier and the project initiator (block 370), and updating the project itinerary to reflect the content of the binding contract (block 375).

As indicated by arrow 380, the method may include, for example, repeating the operations of blocks 320 and onward. This may be performed, for example, until the project initiator closes the entire project; or for a pre-defined time period; or until all (or substantially all, or a pre-defined percentage of) the objects of the project are closed.

Other suitable operations or sets of operations may be used in accordance with some embodiments. In some embodiments, some operations may be performed in parallel, in series, or in other suitable orders or execution.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A method executed on one or more processors for project planning and management, the method comprising:
publishing, over a communications network, a representation of a project specification comprising one or more discrete objects implemented in a computing environment having one or more processor to generate the representation based on a computer-implemented model constructed according to attribute values and constraints defined for said attribute values and attribute value combinations, wherein the discrete objects are represented by said attributes, and relationships between said discrete objects or goals of the project are defined according to designated requirements for the values or constraints associated with said attributes;

publishing a collaborative comment to one or more of the discrete objects, in response to receiving a comment from a user with authority to submit a comment in association with one or more of the discrete objects, wherein said comment proposes a change to one or more attribute values or constraints;

publishing a rating or feedback associated with the collaborative comment based on comments received about the collaborative comment;

receiving at least one supplier proposal to fulfill one or more of the discrete objects in consideration to said values or constraints associated with said attributes;

ranking the submitted supplier proposal, in response to evaluating the supplier proposal against the designated requirements for the values or constraints;

rejecting the submitted supplier proposal, in response to determining that the supplier proposal fails to meet the requirements for the values or constraints;

publishing the supplier proposal for comment and review; and publishing a rating or feedback associated with the suppliers proposal based on comments received about the supplier proposal;

presenting the supplier proposal to at least a project initiator of the project specification;

receiving an indication of acceptance or rejection of the supplier proposal by the project initiator; and if the indication comprises an indication of acceptance of the supplier proposal, closing the one or more discrete objects which the supplier proposal fulfills.

2. The method of claim 1, comprising: if the indication comprises an indication of acceptance of the supplier proposal, generating a binding contract between the project initiator and the supplier based on content of the supplier proposal.

3. The method of claim 1, comprising: if the indication comprises an indication of acceptance of the supplier proposal, updating a project itinerary to reflect content of the supplier proposal.

4. The method of claim 1, comprising:
receiving an indication of acceptance of the collaborative comment by the project initiator; and
automatically modifying the project specification based on the collaborative comment.

5. The method of claim 4, wherein the modifying is selected from the group consisting of:
automatically adding an object to the project specification;
automatically removing an object from the project specification; and
automatically modifying an object of the project specification.

6. The method of claim 1, comprising:
receiving a command to link between two or more of the discrete objects;
linking between the two or more discrete objects; and
publishing a linkage between the two or more discrete objects.

7. The method of claim 6, wherein the linking comprises:
creating a dependency between the two or more discrete objects,
wherein the dependency is selected from the group consisting of:
mandatory one-way dependency;
mandatory two-way dependency; and
non-mandatory dependency.

8. The method of claim 1, wherein at least one discrete object is associated with one or more object attributes representing one or more characteristics of the discrete object set by a project initiator of the project specification.

9. The method of claim 8, wherein the one or more object attributes are selected from the group consisting of:
location for object fulfillment,
date for object fulfillment,
time for object fulfillment, and
price limit for object fulfillment.

10. The method of claim 1, comprising:
reusing one or more of the published discrete objects in for creation of another project specification.

11. The method of claim 1, comprising:
receiving from a project initiator input indicating a topic associated with the project specification; and
presenting to the project initiator a list of user-selectable previously-created discrete objects related to said topic.

12. An apparatus for project planning and management, the apparatus comprising:
one or more processors for generating a representation of a project specification comprising one or more discrete objects, wherein the representation is generated based on a computer-implemented model constructed according to attribute values and constraints defined for said attribute values and attribute value combinations, wherein the discrete objects are represented by said attributes, and relationships between said discrete objects or goals of the project are defined according to designated requirements for the values or constraints associated with said attributes;

wherein a collaborative comment is published, over a communications network, in association with one or more of the discrete objects, in response to receiving a comment from a user with authority to submit a comment in association with one or more of the discrete objects, wherein said comment proposes a change to one or more attribute values or constraints;

wherein a rating or feedback associated with the collaborative comment is published based on comments received about the collaborative comment;

wherein at least one supplier proposal is received to fulfill one or more of the discrete objects in consideration to said values or constraints associated with said attributes;

wherein the submitted supplier proposal is ranked in response to evaluating the supplier proposal against the designated requirements for the values or constraints;

wherein the submitted supplier proposal is rejected in response to determining that the supplier proposal fails to meet the requirements for the values or constraints;

wherein the supplier proposal is published for comment and review; and wherein a rating or feedback associated with the suppliers proposal is published based on comments received about the supplier proposal;

wherein a server in the communications network is to present the supplier proposal to at least a project initiator of the project specification, and to receive an indication of acceptance or rejection of the supplier proposal by the project initiator; and wherein if the indication comprises an indication of acceptance of the supplier proposal, the server is to close the one or more discrete objects which the supplier proposal fulfills.

13. The apparatus of claim 12, wherein if the indication comprises an indication of acceptance of the supplier proposal, the server is to generate a binding contract between the project initiator and the supplier based on content of the supplier proposal.

14. The apparatus of claim 12, wherein if the indication comprises an indication of acceptance of the supplier proposal, the server is to update a project itinerary to reflect content of the supplier proposal.

15. The apparatus of claim 12, wherein the servers is to receive an indication of acceptance of the collaborative comment by the project initiator, to automatically modify the project specification based on the collaborative comment.

16. The apparatus of claim 12, wherein the server is to receive a command to link between two or more of the discrete objects; to link between the two or more discrete objects; and to publish a linkage between the two or more discrete objects.

17. The apparatus of claim 16, wherein the linkage comprises a dependency between the two or more discrete objects, and wherein the dependency is selected from the group consisting of:
   mandatory one-way dependency;
   mandatory two-way dependency; and
   non-mandatory dependency.

18. The apparatus of claim 12, wherein at least one discrete object is associated with one or more object attributes representing one or more characteristics of the discrete object set by a project initiator of the project specification, and wherein the one or more object attributes are selected from the group consisting of:
   location for object fulfillment,
   date for object fulfillment,
   time for object fulfillment, and
   price limit for object fulfillment.

19. A computer program product comprising a non-transitory data storage medium including a computer readable program, wherein the computer readable program when executed on a computer causes the computer to publish a representation of a project specification comprising one or more discrete objects, wherein the representation is generated based on a computer-implemented model constructed according to attribute values and constraints defined for said attribute values and attribute value combinations, wherein the discrete objects are represented by said attributes, and relationships between said discrete objects or goals of the project are defined according to designated requirements for the values or constraints associated with said attributes;

publish a collaborative comment to one or more of the discrete objects, in response to receiving a comment from a user with authority to submit a comment in association with one or more of the discrete objects, wherein said comment proposes a change to one or more attribute values or constraints;

publish a rating or feedback associated with the collaborative comment based on comments received about the collaborative comment;

receive at least one supplier proposal to fulfill one or more of the discrete objects in consideration to said values or constraints associated with said attributes;

rank the submitted supplier proposal in response to evaluating the supplier proposal against the designated requirements for the values or constraints;

reject the submitted supplier proposal in response to determining that the supplier proposal fails to meet the requirements for the values or constraints;

publish the supplier proposal for comment and review;

publish a rating or feedback associated with the suppliers proposal based on comments received about the supplier proposal;

present the supplier proposal to at least a project initiator of the project specification;

receive an indication of acceptance or rejection of the supplier proposal by the project initiator; and if the indication comprises an indication of acceptance of the supplier proposal, closing the one or more discrete objects which the supplier proposal fulfills.

* * * * *